United States Patent [19]
Fiedrich et al.

[11] Patent Number: 5,831,881
[45] Date of Patent: Nov. 3, 1998

[54] METHOD AND CIRCUIT FOR FORWARD/ INVERSE DISCRETE COSINE TRANSFORM (DCT/IDCT)

[75] Inventors: Sven Fiedrich, Berlin; Klaus Grüger, Hanover; Gerriet Müller; Ulrich Schneider, both of Berlin, all of Germany

[73] Assignee: Sican GmbH, Germany

[21] Appl. No.: 565,848

[22] Filed: Dec. 1, 1995

[30] Foreign Application Priority Data

Dec. 2, 1994 [DE] Germany .......................... 44 42 958.4
Dec. 2, 1994 [DE] Germany .......................... 44 42 956.8

[51] Int. Cl.$^6$ .............................. G06F 17/14; G06F 15/00
[52] U.S. Cl. ................................. 364/725.03; 364/726.07
[58] Field of Search ..................... 364/725, 726, 364/727, 725.01–725.03, 726.01–726.03, 726.06, 726.07, 727.01; 382/250, 232, 251, 261; 395/375, 800

[56] References Cited

U.S. PATENT DOCUMENTS

| | | | |
|---|---|---|---|
| 4,821,224 | 4/1989 | Liu et al. | 364/725.02 |
| 4,873,658 | 10/1989 | Cambonie | 364/725.03 |
| 5,117,381 | 5/1992 | Juri et al. | 364/725.03 |
| 5,249,146 | 9/1993 | Uramoto et al. | 364/725.03 |
| 5,293,330 | 3/1994 | Sayegh | 364/726.04 |
| 5,345,563 | 9/1994 | Uihlein | 711/1 |
| 5,357,453 | 10/1994 | Kim et al. | 364/725.03 |
| 5,452,466 | 9/1995 | Fettweis | 395/800.36 |
| 5,574,661 | 11/1996 | Cismas | 395/200.77 |

FOREIGN PATENT DOCUMENTS

| | | |
|---|---|---|
| 0372185 | 6/1990 | European Pat. Off. . |
| 0587443 | 3/1994 | European Pat. Off. . |
| 2 643 477 | 2/1989 | France . |
| 34 16 536 | 11/1984 | Germany . |
| 39 00 349 | 10/1990 | Germany . |
| 40 38 240 | 6/1991 | Germany . |

OTHER PUBLICATIONS

Ahmed et al., "Discrete Cosine Transform," *IEEE Trans. Comput.*, C–23:90–93 (Jan. 1974).

Rao and Yip, "Two–Dimensional DCT Algorithms," *Discrete Cosine Transform*, Academic Press, Inc.: San Diego, pp. 88–121 (1990).

Loeffler et al., "Practical Fast 1–D DCT Algorithms with 11 Multiplications," *IEEE*, 988–991 (1989).

(List continued on next page.)

*Primary Examiner*—Emmanuel L. Moise
*Attorney, Agent, or Firm*—Stephen M. Knauer; Flehr Hohbach Test Albritton & Herbert LLP

[57] ABSTRACT

A method and circuit for forward and backward transform of a DCT and IDCT, based upon the so called "Loeffler-architecture, is disclosed. The circuit has a chip area as small as possible. The method has a small number of calculation operations and a high accuracy of calculation. The respective structures of the disclosed DCT and IDCT are as similar as possible. Based upon the high commonality of this DCT and IDCT pair, using three butterfly stages and one correction stage, the algorithms are adapted to the desired processing performance. Two of the butterfly stages are executed in a simple time multiplexed operation in common circuitry. The data is permuted after the computation of one butterfly stage and fedback via delay lines into the common circuitry for the other butterfly stage. The other stages are operated without a stepwise time multiplexed operation.

12 Claims, 6 Drawing Sheets

OTHER PUBLICATIONS

Duhamel and H'mida, "New $2^n$ DCT Algorithms Suitable for VLSI Implementation," *Proceedings IEEE International Conference on Acoustics, Speech and Signal Processing, ICASSP'87*, 1805–1808 (Apr. 1987).

Pirsch et al., "Orthogonal Transforms," *VLSI Implementations for Image Communications*, Elsevier Science Publishers: Amsterdam, pp. 217–251 (1993).

Lee "A New Algorithm to Compute the Discrete Cosine Transform" *IEEE Transactions on Acoustics, Speed and Signal Processing*, 32(6):1243–1245 (Dec. 1984).

Vetterli et al., "Simple FFT and DCT Algorithms with Reduced Number of Operations," *Signal Processing*, 6:267–278 (1984).

Hwang, "Standard and Recoded Multipliers," *Computer Arithmetic, Principles, Architectures and Design*, John Wiley & Sons, pp. 129–212 (1979).

Pirsch, "VLSI Implementation Strategies," *VLSI Implementations for Image Communications*, Elsevier Science Publishers: Amsterdam, pp. 49–68 (1993).

LSI DSP Datebook (Implementing Fast Fourier Transform Systems with the L64280/81 Chipset. Digital Signal Processing (DSP) Databook. LSI Logic: Milpitas, pp. 258–268 (Jun. 1990).

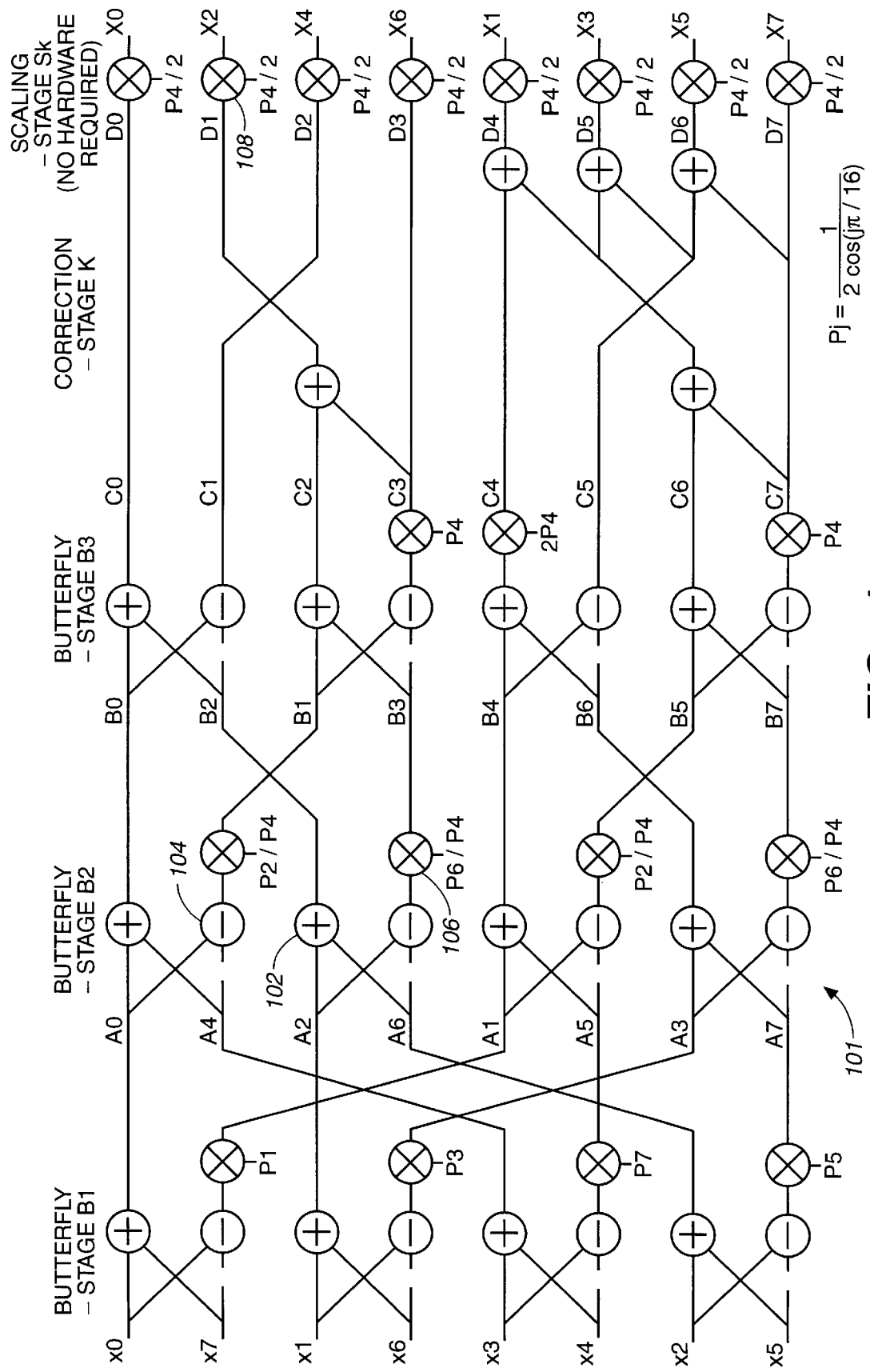
FIG._1

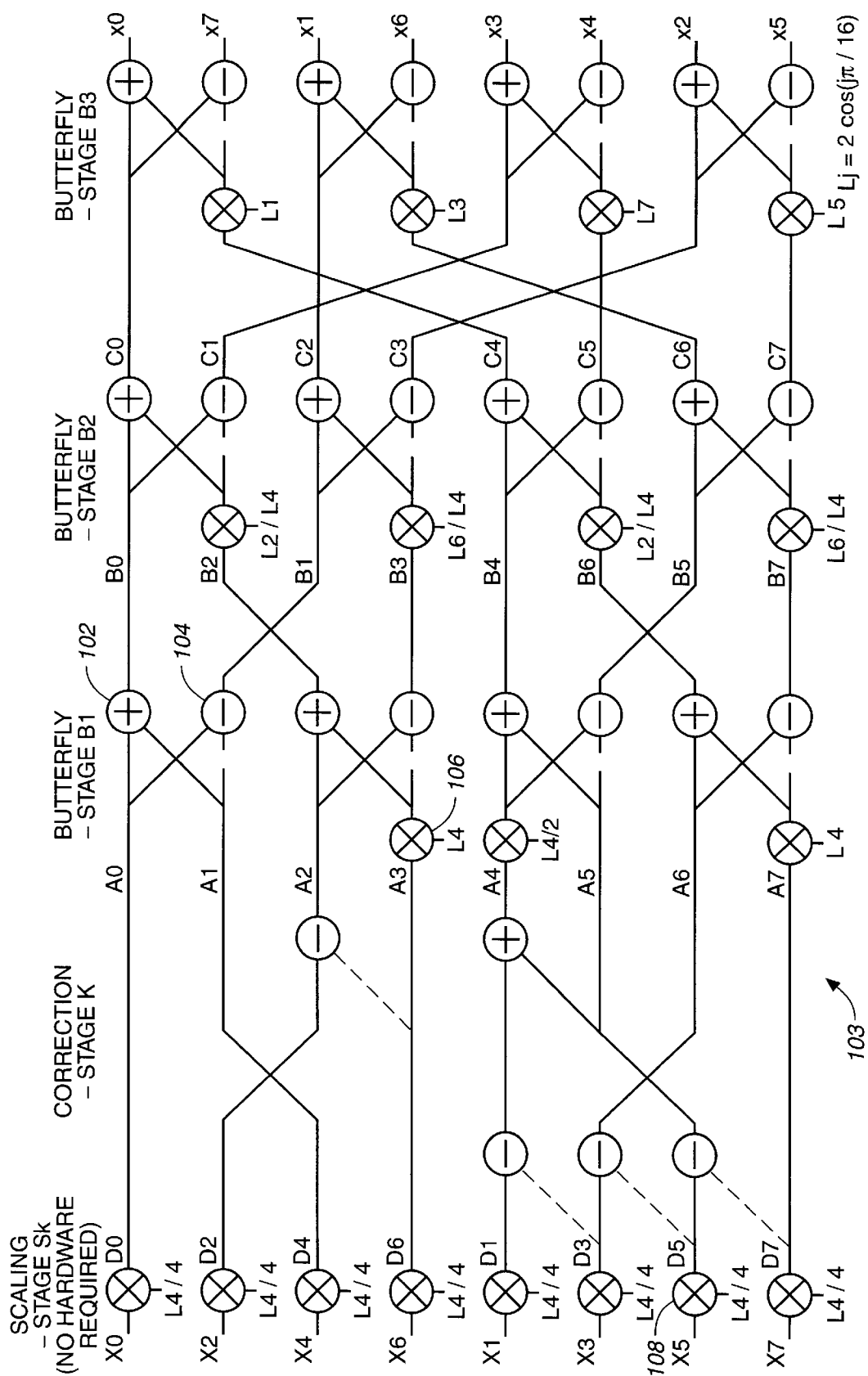
FIG._2

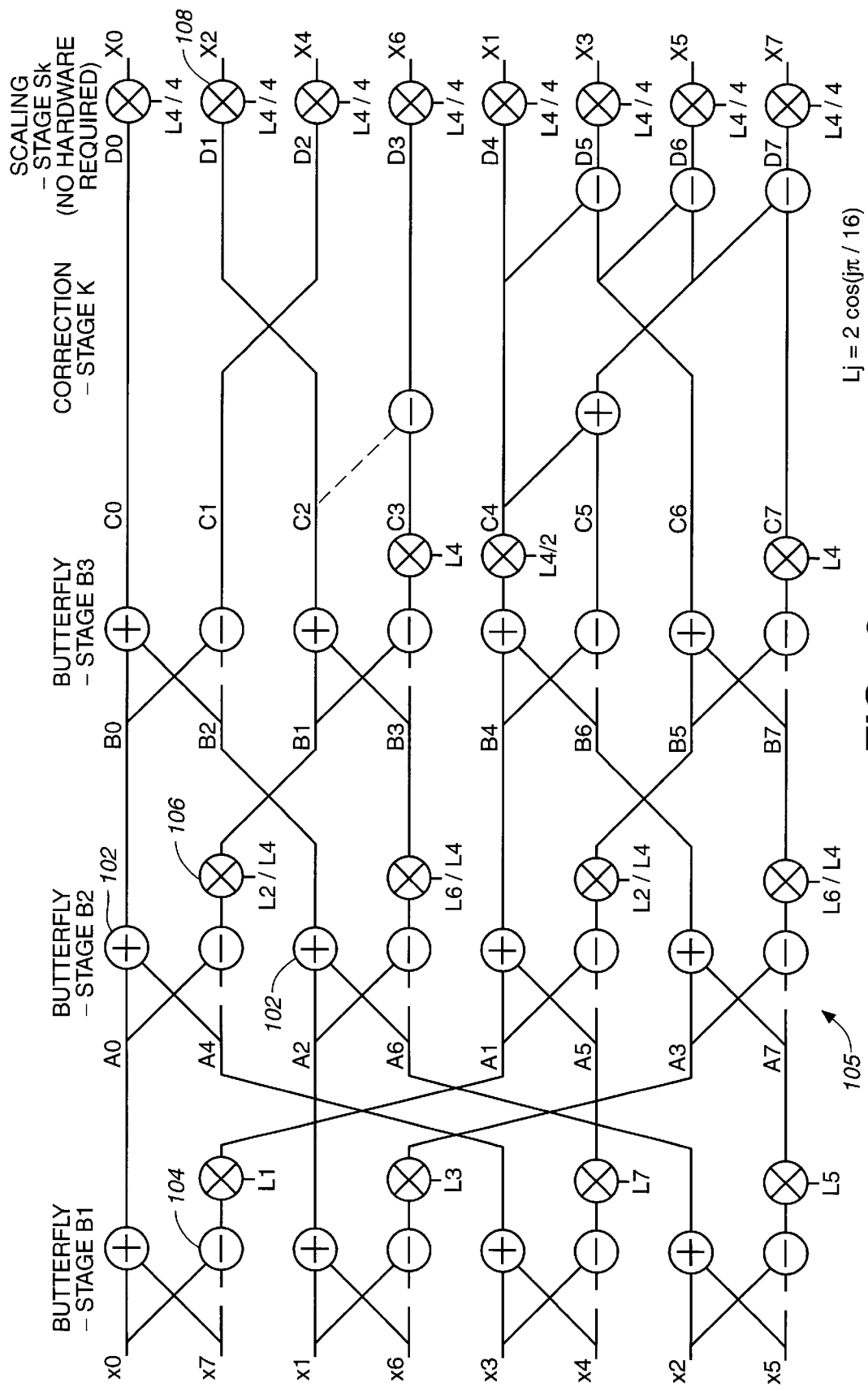
FIG._3

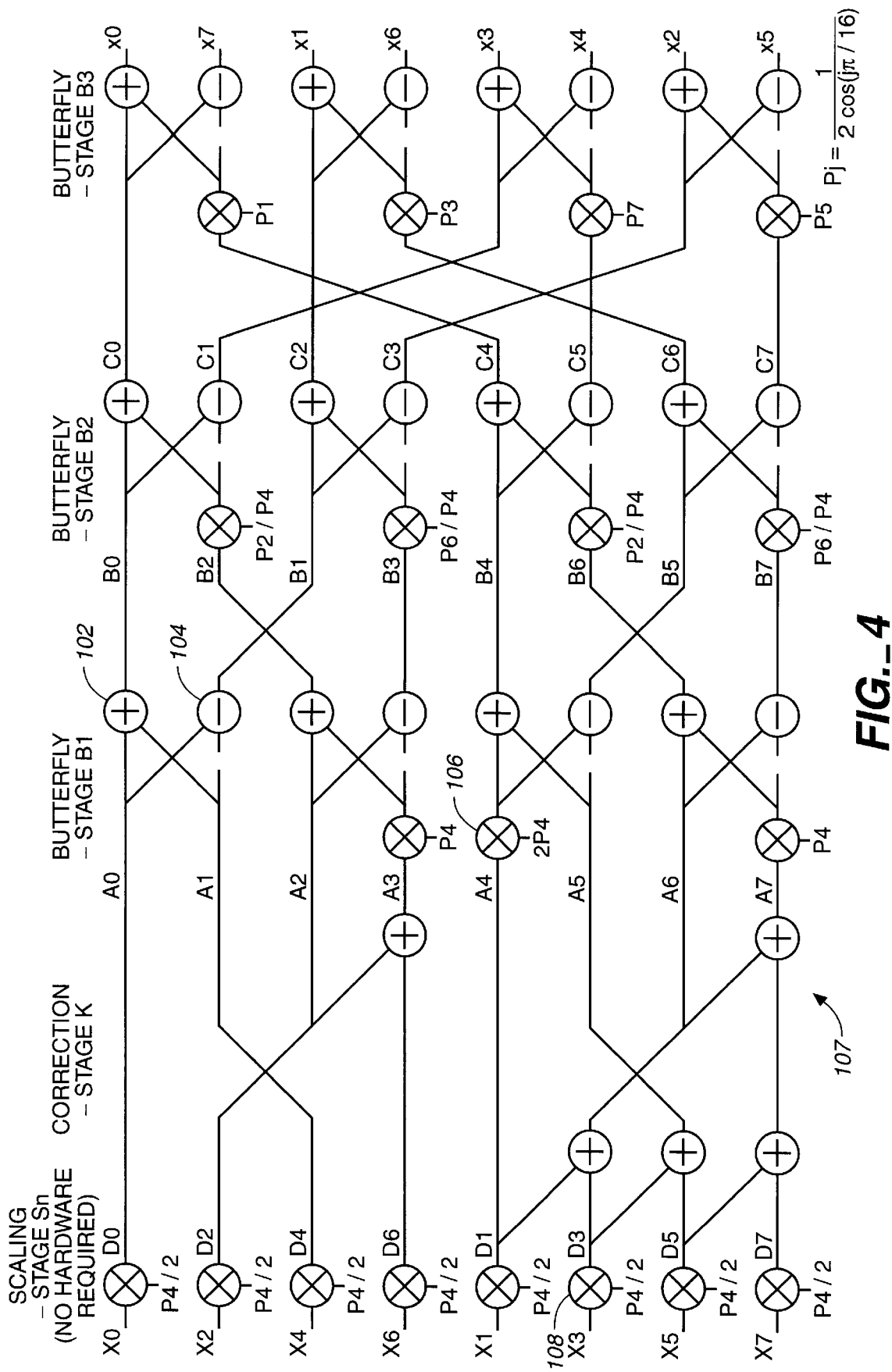
FIG._4

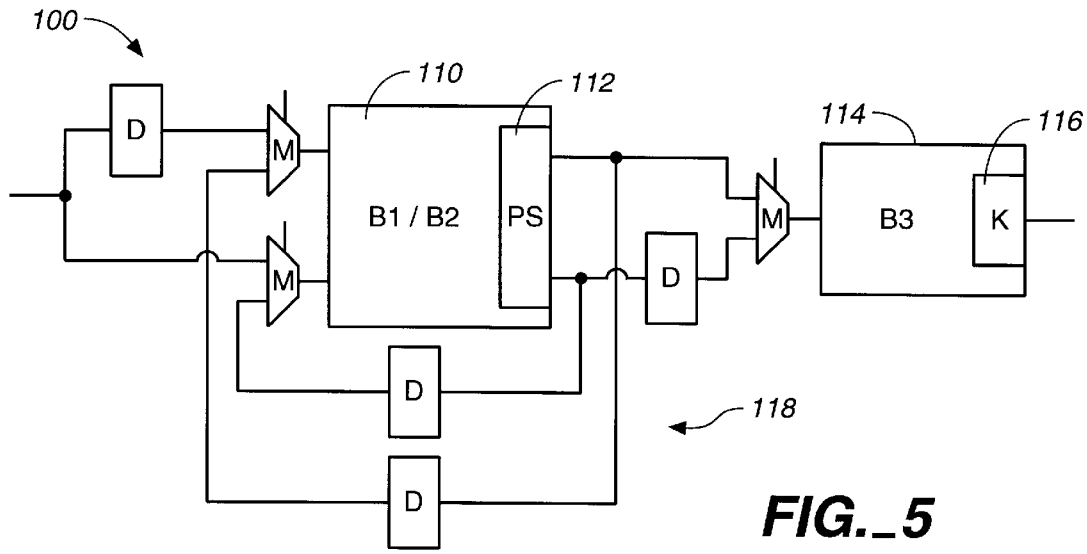
FIG._5
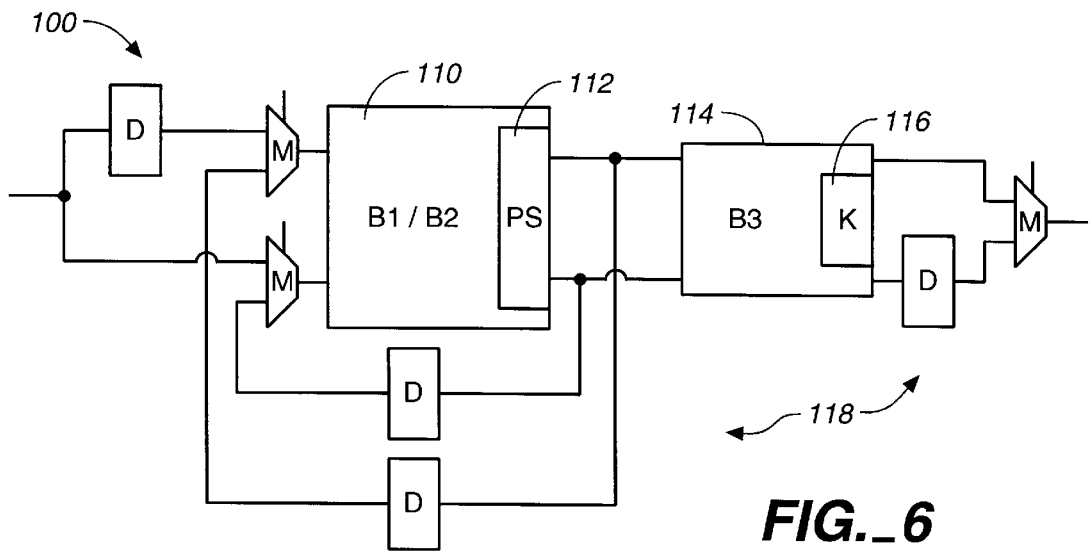
FIG._6

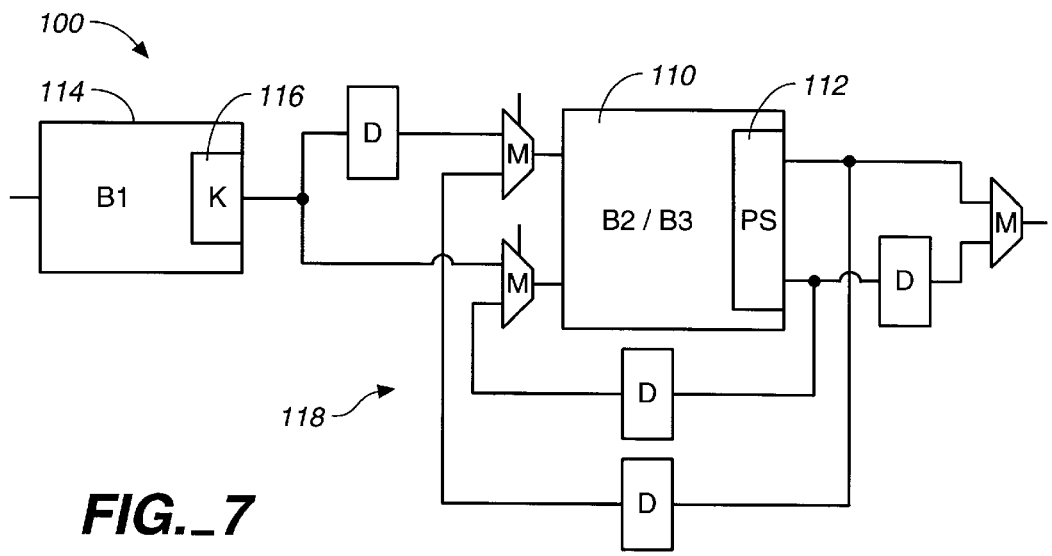
FIG._7
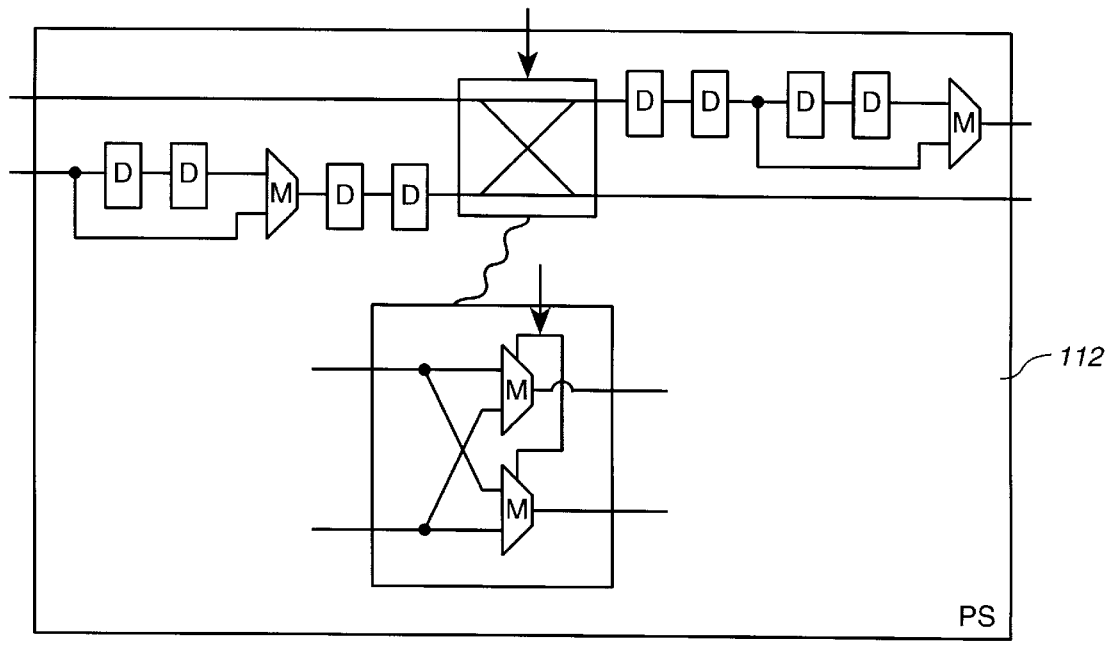
FIG._8

METHOD AND CIRCUIT FOR FORWARD/ INVERSE DISCRETE COSINE TRANSFORM (DCT/IDCT)

The invention relates to a method and a switchable circuit for performing forward and inverse discrete cosine transforms (DCT and IDCT).

BACKGROUND OF INVENTION

The discrete cosine transform (DCT), described in detail in "Discrete Cosine Transform", N. Ahmed, T. Natarajan & K. R. Rao: IEEE transactions on Computer, Vol. C-23, S. 90–93, January 1974, and the inverse DCT (IDCT) are common methods for block transformation of video data signals. They are especially employed for data compression of video signals in the JPEG and MPEG standards, which are defined in "Information Technology—Coding of Moving Pictures and Associated Audio for Digital Storage Media up to about 1.5 Mbit/s", Draft International Standard ISO/IEC DIS 11172, 1992 and "Video Codec for Audiovisual Services at p×64 kbit/s, Recommendation H.261", The International Telegraph and Telephone Consultative Committee (CCITT), 1990.

Standardized methods use block sizes of 8×8 pixels, although other block sizes are usable. These methods use a two-dimensional type of DCT that is separable into two one-dimensional DCT transforms each having a length of 8 pixels. Each of the DCT and IDCT transforms respectively can be represented by a form of vector matrix multiplication. There are a number of circuit structures for calculating a DCT with as low a hardware expenditure as possible, e.g. K. R. Rao, P. Yip: "Discrete Cosine Transform", Academic Press, Inc., San Diego, 1990 and C. Loeffler, A. Lightenberg, G. S. Moschytz: "Practical Fast 1-D DCT Algorithmus with 11 Multiplications", IEEE, S. 988–991, 1989. These basic structures utilize the special characteristics of the multiplication coefficients used for the DCT. The IDCT can be derived from the structures of the DCT by appropriately converting the respective equations of the structures. Moreover, there are proposals for calculating a DCT using special number systems of remainder classes.

In implementing a DCT, a simple signal flow graph can be utilized if the basic operations to be used are divided into shorter partial graphs that are similar and mostly have a butterfly shape. There are other variations possible for performing the multiplication, addition and subtraction operations of the DCT.

There are various signal flow graphs for calculating DCTs and IDCTs using butterfly structures. The valuation of these graphs for optimization depends on the selection of high commonality, short width of words or small number of operations.

The calculational need is determined by the number of multiplications. In "New 2ⁿ DCT Algorithms suitable for VLSI implementation", P. Duhamel, H. H'Mida: , Proceedings IEEE International Conference on Acoustics, Speech and Signal Processing, ICASSP'87, Dallas, April 1987, S. 1805–1808, it was proved that the number or multiplications in an 8-point DCT and an 8 point IDCT can't be lower than 11. In addition to the number of multiplications in a hardware implementation, the bitwidth necessary for a predetermined precision of the multipliers used is also a criteria.

The high commonality of the signal flow graphs is advantageous so that the circuits implementing the DCT and the IDCT can be operated in time multiplexed operations, i.e. the data can be processed serially. For example, in the 8-point DCT and IDCT, the signal flow graph can be used for complete parallel calculation of the eight data output vectors using a large amount of hardware. But, depending on the performance required, the data output vectors can also be calculated where four data input vectors or two data input vectors are given to the circuit in parallel or one data input vector at a time is serially provided to the circuit. This advantageously results in only a half, a quarter or an eighth of the hardware that is required for the complete parallel calculation. Further embodiments for improving the accuracy of the calculation of the DCT and IDCT are disclosed in the following papers: A. Artieri, F. Jutand: "Procede de determination de transformee en cosinus discrete", Brevet No. 89 02347, February 1989; N. Demassieux, F. Jutand: "Orthogonal Transforms", in P. Pirsch, "Implementations for Image Communications, " Elsevier, 1993, S. 217–250; B. G. Lee: "A New Algorithm to Compute the Discrete Cosine Transform", IEEE transactions on Acoustics, Speed and Signal Processing, Vol. 32, No. 6, S. 1243–1245, December 1984; M. Vetterli, H. Nussbaumer: "Simple FFT and DCT Algorithms with Reduced Number of Operations", Signal Processing, Vol. 6, S. 267–278, August 1984.

In contrast to a Fast Fourier Transform (FFT) , various special cases have to be taken into consideration in implementing a DCT. This leads to the butterfly stages being structured with some non-commonality.

In implementing signal flow graphs for algorithms of block transforms, including DCTs and IDCTs among others, several possibilities are available. The whole signal flow graph can be directly implemented in hardware, as it is approximately carried out in U.S. Pat. No. 5,357,453, so that every multiplication requires a fixed wired multiplier, every addition requires an adder and every subtraction requires a subtractor. This results in extremely high throughput rates but also results in a comparatively high hardware expenditure.

An implementation in the other extreme is to carry out the operations one after the other in a programmable unit in a singular time multiplexed operation. One example is disclosed in an LSI-Logic data handbook entitled "Implementing Fast Fourier Transform Systems with the L64280/81 Chipset", Digital Signal Processing (DSP) Databook, Milpitas: LSI Logic, June 1990, S. 258–268. Although his solution is very flexible and results in a high rate of capacity utilization, it causes low throughput rates. Frequently, it is possible to adapt the number of realized butterfly stages to the required throughput rate using a time multiplexed operation. Then, every processing stage is assigned one butterfly stage (see pg. 261 and FIGS. 1 and 2 of the LSI-Logic data handbook).

For such an operation, permutation elements are required to order the data input vectors for each stage. An example for such a circuit for an FFT is provided in U.S. Pat. Nos. 4,821,224 and 5,293,330. In German Patent No. 39 00 349, it is recommened to recursively structure this parallel tasking into the butterfly stages. However, all of these circuits are obviously not DCT/IDCT structures with which a forward and backward transformation is possible.

In most cases, a simple system is designed so that the processing components calculate one data output vector each clock cycle on average. Thereby, every clock cycle also can have several partial clock cycles if necessary. In addition, a synchronous clocked spooling memory may be required between several processing means for the adjustment of data formats. Such a memory typically provides only one data vector per clock cycle, unless it has been expensively divided into multiple memories. Therefore, in this case, butterfly circuitry running in a time multiplexed operation is used for several butterfly stages. In order to achieve an optimal capacity usage of the processing means (processors) and as low a hardware expenditure as possible, the number of processing means must be adapted to the throughput rate.

The costly implementation of multipliers can be minimized by executing the transformation as much as possible with a number of multiplications with constant coefficients. For example, with the combination of fixed wired addition, substraction and shifting operations, the hardware expenditure for multiplications with constant coefficients ranges considerable lower than for multiplications with variable coefficients, as demonstrated in K. Hwang, "Computer Arithmetic, Principles, Architectures and Design", John Wiley & Sons, 1979, and P. Pirsch, "VLSI Implementation Strategies", P. Pirsch (Hrsgb.), VLSI Implementations for Image Communications, Elsevier 1993, page 67.

In most cases, the butterfly stages process two data vectors per clock cycle and run faster than the memory which inputs and outputs one data vector per clock cycle. Corresponding ratios result with processing complex numbers such as, for example, calculating an FFT. Frequently all N stages are performed in time one after another. With optimal inputing and outputing of the data vectors via an adapted spooling memory, the throughput rate achieved with N stages then sinks off at the 2/N-part of the value. For obtaining an optimized throughput rate having a minimal hardware expenditure, it is necessary to select the number of realized butterfly stages so, that the value N/2 corresponds to the number of values to be processed in one clock cycle. With an uneven number N, however, N/2 is not whole-numbered. The corresponding problem, in which the optimal number of butterfly stages is not whole-numbered, is valid for comparable assignments.

In each of these cases, no optimal implementation has been possible until now. This applies, for example, to three-stage implemented signal flow graphs for an 8-point DCT. If for example, only one butterfly processor is used, the processing unit is used completely in time, but the throughput rate of the memory and the whole system, however, sinks to ⅔ of the maximum. If two and three butterfly processors are used in order to achieve a throughput rate of one data vector per clock cycle, the processors are not completely utilized.

In German Patent No. 40 38 240, a processor for realizing orthogonal transforms is disclosed. The transform is split into two one-dimension transforms where two processing means with corresponding adders and multipliers are available. The number of multiplications is reduced using ROM tables. The size of these tables is reduced by a suitable addressing method. The described method, however, does not solve the problem of forward and backward transforms of a DCT and an IDCT. A very flexibly circuit for forward and backward transforms is described in U.S. Pat. No. 4,873,658. A bus system that is dividable in sectors can be individually connected with a spooling memory and operator units. With it, each sector disposes at least one operator unit. This circuit disadvantageously requires a multitude of operator units and multipliers that require a relatively high chip area. Hence, the flexibility of the circuit increases the chip area and results in increased costs.

A very flexible circuit having only four multipliers, four adders, selectors, a memory for storing coefficients, a spooling memory and one control unit is disclosed in German Patent No. 34 16 536. Here, data vectors in a discrete FFT will be multiplied in parallel and the results will be sent to respective adders via the selectors. There, they will be added to further provisional results and stored in the spooling memory. The circuit can be adapted very flexibly to new processing methods with relative small implementation needs.

OBJECT OF THE INVENTION

One object of the invention is to provide a method for forward and backward transform of a DCT and an IDCT which is suitable for a circuit having a chip area as small as possible. Furthermore, another object is to provide the specified circuit for this method. The method should have a small number of calculation operations and the accuracy of the calculation operations should be as high as possible. As a result, the specified circuit depends to a large extent on the arrangement of the butterfly stages.

Since the DCT and IDCT frequently run asynchronously anyway, a far reaching operation can be performed in a time multiplexed operation if the respective structures of the DCT an IDCT structure are as similar as possible. In the known basic DCT and IDCT structures, this is not the case but is solved by the present invention.

SUMMARY OF INVENTION

The objects of the invention are solved by a method and a circuit for implementing a DCT and IDCT pair according to the flow graphs described herein. Based upon the high commonality of the flow graphs for the DCT and IDCT pair, the flow graphs can be adapted to a desired processing performance of the circuit. This circuit can be realized with a very low hardware expenditure.

A plurality of butterfly stages for performing the transforms will be executed in a simple time multiplexed operation in common circuitry. The data vectors computed for one stage are ordered and fedback via a delay lines into the the common circuitry for the next stage. The signal flow graphs have to be chosen so that the costly programmable multiplications have to be implemented in a maximum of N-1 butterfly stages, where N identifies the total number of butterfly stages. Following the common circuitry that runs in a time multiplexed operation, other circuitry operates without running in a stepwise time multiplexed operation. Thereby, a utilization degree of one is achieved in the common circuitry for performing the stages having the costly multiplications, while in the circuitry for the following stages the degree merely ranges around 0.5. Since the following stages in general have only a fractional amount of the total expense, a total utilization degree of almost 1 is achieved.

With the invention, there are only a comparatively sparse number of different multiplication coefficients. Thus, a multiplier of the common circuitry can be implemented with fixed wires.

BRIEF DESCRIPTION OF DRAWINGS

With the help of the following figures the invention will be explained. These figures include:

FIG. 1 which shows a first signal flow graph for processing a DCT;

FIG. 2 which shows a first signal flow graph for processing the IDCT derived from the signal flow graph according to FIG. 1;

FIG. 3 which shows a second signal flow graph for processing the DCT;

FIG. 4 which shows a second signal flow graph for processing the IDCT derived from the signal flow graph according to FIG. 2;

FIG. 5 which shows a circuit for processing a DCT transform comprising butterfly stages operating in time multiplex and another butterfly stage not operating in time multiplex;

FIG. 6 which shows a circuit for processing a DCT transform comprising butterfly stages that all operate in time multiplex;

FIG. 7 which shows a circuit for processing an IDCT transform comprising butterfly stages operating in time multiplex and another butterfly stage not operating in time multiplex;

FIG. 8 which shows a circuit for permutation of data vectors.

DETAILED DESCRIPTION OF THE PREFERRED EMBODIMENTS

A known signal flow graph 101 for processing a DCT, described by Loeffler, is shown in FIG. 1, Inverting this graph, the flow graph 103 for an IDCT, shown in FIG. 2, is achieved. The circuit 100 of the invention, shown in FIGS. 5 to 7, for the realization of the DCT and IDCT can be well understood by the described flow graphs 101, 103, 105, and 107 of FIGS. 1 to 4.

Using eleven multiplications 106, the basic structure of the flow graphs 101 and 105 of FIGS. 1 and 3 each achieve the theoretical minimum required for implementing the DCT. Also, the 29 additions 102 and subtractions 104 are very low compared to other algorithms. The scaling coefficients (or factors) P4/2 and L4/4 respectively correspond to the coefficient $\sqrt{2}/4$ which forms the scaling coefficient $\frac{1}{8}$ in a two dimensional calculation of the DCT. Multiplication 108 with this scaling coefficient can be described as a bitwise shifting and doesn't require any hardware to implement. Apart from the simple realization of a correction stage, both graphs 101 and 105 of FIGS. 1 and 3 have a very high commonality.

Stepwise inversion of the DCT signal flow graphs 101 and 105 of FIGS. 1 and 3 respectively result in the IDCT signal flow graphs 103 and 107 of FIGS. 2 and 4 having similar characteristics. Thus, they also require 11 multiplications 106 and 29 additions 102 and subtractions 104 and have a very good ratio of applied bit width to calculation accuracy.

The signal flow graph 101 of the DCT of FIG. 1 can be combined with the signal flow graph 107 of the IDCT of FIG. 4 and the signal flow graph 105 of the DCT of FIG. 3 can be combined with the signal flow graph 103 of the IDCT of FIG. 2 to respectively provide two possible embodiments of the DCT/IDCT circuit 100. The circuit 100 can be configured in such a manner that the DCT and IDCT are implemented as in the drawn structure of the flow graphs 101 and 107 of FIGS. 1 and 4 for one embodiment or the flow graphs 103 and 105 of FIGS. 2 and 3 for the other embodiment. This is done by means of a multitude of adders, subtractors and multipliers that perform the additions 102, subtractions 104 and multiplications 106. However, compared to other known signal flow graphs, the signal flow graphs of FIGS. 1 and 4 and FIGS. 2 and 3 have a very good regularity. Thus, it is possible to implement the flow graphs of either of the embodiments in a simple programmable time multiplexed operation in circuit 100, as shown in FIGS. 5 to 7. This is done with only a few of adders, subtractors and multipliers to perform the additions 102, subtractions 104 and multiplications 106. In all of these implementations, the same structures and linkings in the circuit 100 are used for both the DCT and IDCT so that the same adders, subtractors and multipliers are used for both the DCT and the IDCT.

Since only seven different coefficients appear, fixed-wired multipliers can be used. Thus, the coefficients L4 and 2P4 for the two embodiments are equal to $\sqrt{2}$ and can be realized simply by using a fixed-wired multiplier. Then, the algorithms for the DCT and IDCT of either embodiment each require exactly eight real number multiplications for eight values in the first two and the last two stages of respectively the DCT and IDCT. This is convenient for effecting a time multiplexed operation. By realizing one additional fixed-wired multiplier to multiply the coefficients L2/L4 and L6/L4 in the embodiment implementing the signal flow graphs 103 and 105 of FIGS. 2 and 3 and the coefficients P2/P4 and P6/P4 in the embodiment implementing the signal flow graphs 101 and 107 of FIGS. 1 and 4, only four real multiplications must be performed. This advantageously allows calculation of two values for each cycle in the time multiplexed operation. Based upon the high commonality of the DCT and IDCT, it is possible to adapt the pair of algorithms for the DCT and IDCT of either embodiment to the desired processing performance and achieve a very good ratio of hardware expenditure to processing performance.

In a DCT frequently used in methods for coding pictures having a length of 8 pixels, it is possible to find butterfly circuitry requiring a very costly programmable multiplier for the first two butterfly stages B1 and B2. In the butterfly circuitry for the third butterfly stage B3, only a very simple fixed wired multiplier is needed that multiplies the coefficient $\sqrt{2}$ (2P4) or $\sqrt{2}/2$ (P4). In either case, shifting between these two multiplication coefficients is very simple. For example, using the usual binary number system, only a bitwise displacement of the multiplicands is necessary.

Additionally, a simple correction stage K and a scaling stage Sk is necessary. The correction stage only contains simple additions and can be easily implemented. Scaling with the factor P4/2 corresponds to multiplying by the coefficient $\sqrt{2}/4$. In a two-dimensional DCT (2D-DCT), such as is used for picture coding procedures, this scaling is required twice, Based upon the fundamental linear character of the arrangement, it is possible to form the coefficient $\frac{1}{8}$. This factor corresponds to the square of $\sqrt{2}/4$ and can be implemented in association with the usual set of numerative systems without any additional hardware using fixed-wired shift operations.

In addition to implementation of the data input and data output, only the hardware circuitry 110, 112, 114 for implementing the butterfly stages B1, B2, and B3, the permutation stage PS and the correction stage K are required. Therefore, as shown in FIG. 5, it is possible with the circuit 100 to process the two first costly butterfly stages B1/B2 of the DCT in a time multiplexed operation in the butterfly circuitry 110 and the last simple structured butterfly stage B3 directly in one processing clock cycle in the butterfly circuitry 114. Thereby, the butterfly circuitry 114 that implements the butterfly stage B3 also includes correction circuitry 116 to implement the necessary correction stage K. For the processing in the time multiplexed operation, additional circuitry 118 that is implements synchronous delays D (pipeline stages) and multiplexers M is necessary in order to carry out the serial/parallel-shift and the parallel/serial-shift operations. As shown in FIG. 6, if the butterfly stage B3 is operated in a time multiplexed operation, the parallel/serial-shift operation is carried out only after this step.

With such a multiplexed operation, at the very least the expensive hardware part of the circuit 100 is completely used without reducing the throughput rate. This characteristic feature enables an efficient hardware realization.

Using adapted butterfly circuitry 110 and 114 and an inversion of the DCT processing, this basic principle can be applied to the IDCT processing as well. In this case, as shown in FIG. 7, the butterfly circuitry 114 used for the butterfly stage B1 of the IDCT can be operated without a time multiplexed operation using fixed-wired multipliers, while the costly butterfly circuitry 110 for the butterfly stages B2/B3 of the IDCT are run in a time multiplexed operation. Here, the few delays D and multiplexers M of the circuitry 118 are necessary for the time multiplexed operation as well.

Between the butterfly stages B1, B2, and B3, the data vectors have to be permuted when necessary so that the output data vectors for the previous butterfly stage are in the correct order at the input of the next butterfly stage. This permutation can be performed, for example, using the permutation circuitry 112 shown in FIG. 8. The arrangement of memory and multiplexers, however, depends on the transform algorithm and has to be adapted to the respective function.

The circuit 100 can be used for FFTs as well. In that case, complex numbers are used. The required operations can be transformed into real additions, subtractions and multiplications. Besides additions and subtractions in the first and last stages respectively, only multiplications by the values are required. And, in the second and the second to last stages respectively, multiplications by the imaginary number i are required. Both can be easily realized without any hardware multipliers. In the third and third to last stages respectively, additional multiplications by the coefficient $\sqrt{2}/4$ are necessary and are implemented by a fixed-wired multiplier. In this case, it is worth removing up to three stages.

We claim:

1. A DCT/IDCT circuit for performing both a DCT and a corresponding IDCT, the DCT having successive butterfly stages followed by a corrective stage, the IDCT having a corrective stage followed by successive butterfly stages, the DCT/IDCT circuit comprising:

butterfly circuitry comprising adders, subtractors and multipliers to (a) implement the butterfly stages of the DCT by performing additions, subtractions, and multiplications with multiplication coefficients with respectively the adders, subtractors and multipliers, and (b) implement the butterfly stages of the IDCT by performing additions, subtractions, and multiplications with the multiplication coefficients with respectively the adders, subtractors, and multipliers used to perform the DCT; and correction circuitry to implement the correction stages of the DCT and IDCT.

2. An DCT/IDCT circuit as claimed in claim 1 wherein the butterfly circuitry includes common circuitry to implement multiplexed ones of the butterfly stages of the DCT in a time multiplexed operation and implement multiplexed ones of the butterfly stages of the IDCT in a time multiplexed operation.

3. An DCT/IDCT circuit as claimed in claim 1 wherein:

the butterfly stages of the DCT comprise a first butterfly stage, a second butterfly stage, and a third butterfly stage:

for the first butterfly stage of the DCT, the butterfly circuitry computes output data vectors $A_0$ to $A_7$ of the first butterfly stage of the DCT from input data vectors $x_0$ to $x_7$ of the first butterfly stage of the DCT by performing additions, subtractions, and multiplications with multiplication coefficients $L_1$, $L_3$, $L_5$, and $L_7$ using respective ones of the adders, subtractors, and multipliers of the butterfly circuitry according to: $A_0=x_0+x_7$, $A_1=(x_0-x_7)\times L_1$, $A_2=(x_1+x_6)$, $A_3=(x_1-x_6)\times L_3$, $A_4=x_3+x_4$, $A_5=(x_3-x_4)\times L_7$, $A_6=x_2+x_5$, and $A_7=(x_2-x_5)\times L_5$;

for the second butterfly stage of the DCT, the butterfly circuitry computes output data vectors $B_0$ to $B_7$ of the second butterfly stage of the DCT from the output data vectors $A_0$ to $A_7$ of the first butterfly stage of the DCT by performing additions, subtractions, and multiplications with multiplication coefficients $L_2/L_4$ and $L_6/L_4$ using respective ones of the adders, subtractors, and multipliers of the butterfly circuitry according to: $B_0=A_0+A_4$, $B_1=(A_0-A_4)\times L_2/L_4$, $B_2=A_2+A_6$, $B_3=(A_2-A_6)\times L_6/L_4$, $B_4=A_1+A_5$, $B_5=(A_1-A_5)\times L_2/L_4$, $B_6=A_3+A_7$, and $B_7=(A_3-A_7)\times L_6/L_4$;

for the third butterfly stage of the DCT, the butterfly circuitry computes output data vectors $C_0$ to $C_7$ of the third butterfly stage of the DCT from the output data vectors $B_0$ to $B_7$ of the second butterfly stage of the DCT by performing additions, subtractions, and multiplications with multiplication coefficients $L_4$ and $L_4/2$ using respective ones of the adders, subtractors, and multipliers of the butterfly circuitry according to: $C_0=B_0+B_2$, $C_1=B_0-B_2$, $C_2=B_2+B_3$, $C_3=(B_1-B_3)\times L_4$, $C_4=(B_4+B_6)\times L_4/2$, $C_5=B_4-B_6$, $C_6=B_5+B_7$, and $C_7=(B_5-B_7)\times L_4$;

for the correction stage of the DCT, the correction circuitry computes output data vectors $D_0$ to $D_7$ of the correction stage of the DCT from input data vectors $C_0$ to $C_7$ of the correction stage of the DCT according to: $D_0=C_0$, $D_1=C_2$, $D_2=C_1$, $D_3=C_2-C_3$, $D_4=C_4$, $D_5=C_4-C_6$, $D_6=C_6-C_4-C_5$, and $D_7=C_4+C_5-C_7$;

where $L_j=2\cos(j\pi/16)$ and $j=1$ to 7.

4. An DCT/IDCT circuit as claimed in claim 3 wherein:

for the correction stage of the IDCT, the correction circuitry computes output data vectors $A_0$ to $A_7$ of the correction stage of the IDCT from in put data vectors $D_0$ to $D_7$ of the correction stage of the DCT according to: $A_0=D_0$, $A_1=D_4$, $A_2=D_2-D_6$, $A_3=D_6$, $A_4=D_1-D_3+D_5-D_7$, $A_5=D_5-D_7$, $A_6=D_3-D_5$, and $A_7=D_7$;

the butterfly stages of the IDCT comprise a first butterfly stage, a second butterfly stage, and a third butterfly stage:

for the first butterfly stage of the IDCT, the butterfly circuitry computes output data vectors $B_0$ to $B_7$ of the first butterfly stage of the IDCT from the output data vectors $A_0$ to $A_7$ of the correction stage of the IDCT by performing additions, subtractions, and multiplications with multiplication coefficients $L_4$ and $L_4/2$ using respective ones of the adders, subtractors, and multipliers of the butterfly circuitry according to: $B_0=A_0+A_1$, $B_1=A_0-A_1$, $B_2=A_2+A_3\times L_4$, $B_3=A_2-A_3\times L_4$, $B_4=A_4\times L_4/2+A_5$, $B_5=A_4\times L_4/2-A_5$, $B_6=A_6+A_7\times L_4$, $B_7=A_6-A_7\times L_4$;

for the second butterfly stage of the IDCT, the butterfly circuitry computes output data vectors $C_0$ to $C_7$ of the second butterfly stage of the IDCT from the output data vectors $B_0$ to $B_7$ of the first butterfly stage of the IDCT by performing additions, subtractions, and multiplications with multiplication coefficients $L_2/L_4$ and $L_6/L_4$ using respective ones of the adders, subtractors, and multipliers of the butterfly circuitry according to: $C_0=B_0+B_2\times L_2/L_4$, $C_1=B_0-B_2\times L_2/L_4$, $C_2=B_1+B_3\times L_6/L_4$, $C_3=B_1-B_3\times L_6/L_4$, $C_4=B_4+B_6\times L_2/L_4$, $C_5=B_4-B_6\times L_2/L_4$, $C_6=B_5+B_7\times L_6/L_4$, $C_7=B_5-B_7\times L_6/L_4$;

for the third butterfly stage of the IDCT, the butterfly circuitry computes output data vectors $x_0$ to $x_7$ of the third butterfly stage of the IDCT from the output data vectors $C_0$ to $C_7$ of the second butterfly stage of the IDCT by performing additions, subtractions, and multiplications with multiplication coefficients $L_1$, $L_3$, $L_5$, and $L_7$ using respective ones of the adders, subtractors, and multipliers of the butterfly circuitry according to: $x_0=C_0+C_4\times L_1$, $x_1=C_2+C_6\times L_3$, $x_2=C_3+C_7\times L_5$, $x_3=C_1+C_5\times L_7$, $x_4=C_1-C_5\times L_7$, $x_5=C_3-C_7\times L_5$, $x_6=C_2-C_6\times L_3$, $x_4=C_0-C_4\times L_1$.

5. An DCT/IDCT circuit as claimed in claim 1 wherein:

for the correction stage of the IDCT, the correction circuitry computes output data vectors $A_0$ to $A_7$ of the correction stage of the IDCT from input data vectors $D_0$ to $D_7$ of the correction stage of the DCT according to: $A_0=D_0$, $A_1=D_4$, $A_2=D_2$, $A_3=D_2+D_6$, $A_4=D_1$, $A_5=D_5+D_3$, $A_6=D_1+D_3$, and $A_7=D_1+D_3+D_5+D_7$;

the butterfly stages of the IDCT comprise a first butterfly stage, a second butterfly stage, and a third butterfly stage:

for the first butterfly stage of the IDCT, the butterfly circuitry computes output data vectors $B_0$ to $B_7$ of the first butterfly stage of the IDCT from the output data vectors $A_0$ to $A_7$ of the correction stage of the IDCT by performing additions, subtractions, and multiplications with multiplication coefficients $P_4$ and $2P_4$ using respective ones of the adders, subtractors, and multipliers of the butterfly circuitry according to: $B_0=A_0+A_1$, $B_1=A_0-A_1$, $B_2=A_2+A_3\times P_4$, $B_3=A_2-A_3\times P_4$, $B_4=A_4\times 2P_4+A_5$, $B_5=A_4\times 2P_4-A_5$, $B_6=A_6+A_7\times P_4$, $B_7=A_6-A_7\times P_4$;

for the second butterfly stage of the IDCT, the butterfly circuitry computes output data vectors $C_0$ to $C_7$ of the second butterfly stage of the IDCT from the output data vectors $B_0$ to $B_7$ of the first butterfly stage of the IDCT by performing additions, subtractions, and multiplications with multiplication coefficients $P_2/P_4$ and $P_6/P_4$ using respective ones of the adders, subtractors, and multipliers of the butterfly circuitry according to: $C_0=B_0+B_2\times P_2/P_4$, $C_1=B_0-B_2\times P_2/P_4$, $C_2=B_1+B_3\times P_6/P_4$, $C_3=B_1-B_3\times P_6/P_4$, $C_4=B_4+B_6\times P_2/P_4$, $C_5=B_4-B_6\times P_2/P_4$, $C_6=B_5+B_7\times P_6/P_4$, $C_7=B_5-B_7\times P_6/P_4$;

for the third butterfly stage of the IDCT, the butterfly circuitry computes output data vectors $x_0$ to $x_7$ of the third butterfly stage of the IDCT from the output data vectors $C_0$ to $C_7$ of the second butterfly stage of the IDCT by performing additions, subtractions, and multiplications with multiplication coefficients $P_1$, $P_3$, $P_5$, and $P_7$ using respective ones of the adders, subtractors, and multipliers of the butterfly circuitry according to: $x_0=C_0+C_4\times P_1$, $x_1=C_2+C_6\times P_3$, $x_2=C_3+C_7\times P_5$, $x_3=C_1+C_5\times P_7$, $x_4=C_1-C_5\times P_7$, $x_5=C_3-C_7\times P_5$, $x_6=C_2-C_6\times P_3$, $x_4=C_0-C_4\times P_1$;

where $P_j=1/(2\cos j\pi/16))$ and $j=1$ to 7.

6. An DCT/IDCT circuit as claimed in claim 5 wherein:

the butterfly stages of the DCT comprise a first butterfly stage, a second butterfly stage, and a third butterfly stage:

for the first butterfly stage of the DCT, the butterfly circuitry computes output data vectors $A_0$ to $A_7$ of the first butterfly stage of the DCT from input data vectors $x_0$ to $x_7$ of the first butterfly stage of the DCT by performing additions, subtractions, and multiplications with multiplication coefficients $P_1$, $P_3$, $P_5$, and $P_7$ using respective ones of the adders, subtractors, and multipliers of the butterfly circuitry according to: $A_0=x_0+x_7$, $A_1=(x_0-x_7)\times P_1$, $A_2=(x_1+x_6)$, $A_3=(x_1-x_6)\times P_3$, $A_4=x_3+x_4$, $A_5=(x_3-x_4)\times P_7$, $A_6=x_2+x_5$, and $A_7=(x_2-x_5)\times P_5$;

for the second butterfly stage of the DCT, the butterfly circuitry computes output data vectors $B_0$ to $B_7$ of the second butterfly stage of the DCT from the output data vectors $A_0$ to $A_7$ of the first butterfly stage of the DCT by performing additions, subtractions, and multiplications with multiplication coefficients $P_2/P_4$ and $P_6/P_4$ using respective ones of the adders, subtractors, and multipliers of the butterfly circuitry according to: $B_0=A_0+A_4$, $B_1=(A_0-A_4)\times P_2/P_4$, $B_2=A_2+A_6$, $B_3=(A_2-A_6)\times P_6/P_4$, $B_4=A_1+A_5$, $B_5=(A_1-A_5)\times P_2/P_4$, $B_6=A_3+A_7$, and $B_7=(A_3-A_7)\times P_6/P_4$;

for the third butterfly stage of the DCT, the butterfly circuitry computes output data vectors $C_0$ to $C_7$ of the third butterfly stage of the DCT from the output data vectors $B_0$ to $B_7$ of the second butterfly stage of the DCT by performing additions, subtractions, and multiplications with multiplication coefficients $P_4$ and $P_4/2$ using respective ones of the adders, subtractors, and multipliers of the butterfly circuitry according to: $C_0=B_0+B_2$, $C_1=B_0-B_2$, $C_2=B_2+B_3$, $C_3=(B_1-B_3)\times P_4$, $C_4=(B_4+B_6)\times P_4/2$, $C_5=B_4-B_6$; $C_6=B_5+B_7$, and $C_7=(B_5-B_7)\times P_4$;

for the correction stage of the DCT, the correction circuitry computes output data vectors $D_0$ to $D_7$ of the correction stage of the DCT from input data vectors $C_0$ to $C_7$ of the correction stage of the DCT according to: $D_0=C_0$, $D_1=C_2+C_3$, $D_2=C_1$, $D_3=C_3$, $D_4=C_4+C_6+C_7$, $D_5=C_5+C_6+C_7$, $D_6=C_5+C_7$ and $D_7=C_7$.

7. A method for performing both a DCT and a corresponding IDCT, the DCT having successive butterfly stages followed by a corrective stage, the IDCT having a corrective stage followed by successive butterfly stages, the method comprising the steps of:

implement the butterfly stages of the DCT by performing additions, subtractions, and multiplications with multiplication coefficients with respectively adders, subtractors and multipliers of butterfly circuitry;

implement the butterfly stages of the IDCT by performing additions, subtractions, and multiplications with the multiplication coefficients with respectively the same adders, subtractors, and multipliers of the butterfly circuitry that are used to perform the DCT; and implement the correction stage of the DCT with correction circuitry; and implement the correction stage of the IDCT with the correction circuitry.

8. A method as claimed in claim 7 wherein:

the butterfly stages implementing step for the DCT includes implementing multiplexed ones of the butterfly stages of the DCT in a time multiplexed operation with common circuitry of the butterfly circuitry;

the butterfly stages implementing step for the IDCT includes implementing multiplexed ones of the butterfly stages of the IDCT in a time multiplexed operation with the common circuitry of the butterfly circuitry.

9. A method as claimed in claim 7 wherein:

the butterfly stages of the DCT comprise a first butterfly stage, a second butterfly stage, and a third butterfly stage:

the butterfly stages implementing step for the DCT includes computing output data vectors $A_0$ to $A_7$ of the first butterfly stage of the DCT from input data vectors $x_0$ to $x_7$ of the first butterfly stage of the DCT by performing additions, subtractions, and multiplications with multiplication coefficients $L_1$, $L_3$, $L_5$, and $L_7$ using respective ones of the adders, subtractors, and multipliers of the butterfly circuitry according to: $A_0=x_0+x_7$, $A_1=(x_0-x_7)\times L_1$, $A_2=(x_1+x_6)$, $A_3=(x_1-x_6)\times L_3$, $A_4=x_3+x_4$, $A_5=(x_3-x_4)\times L_7$, $A_6=x_2+x_5$, and $A_7=(x_2-x_5)\times L_5$;

the butterfly stages implementing step for the DCT includes computing output data vectors $B_0$ to $B_7$ of the second butterfly stage of the DCT from the output data vectors $A_0$ to $A_7$ of the first butterfly stage of the DCT by performing additions, subtractions, and multiplications with multiplication coefficients $L_2/L_4$ and $L_6/L_4$ using respective ones of the adders, subtractors, and multipliers of the butterfly circuitry according to: $B_0=A_0+A_4$, $B_1=(A_0-A_4)\times L_2/L_4$, $B_2=A_2+A_6$, $B_3=(A_2-A_6)\times L_6/L_4$, $B_4=A_1+A_5$, $B_5=(A_1-A_5)\times L_2/L_4$, $B_6=A_3+A_7$, and $B_7=(A_3-A_7)\times L_6/L_4$;

the butterfly stages implementing step for the DCT includes computing output data vectors $C_0$ to $C_7$ of the third butterfly stage of the DCT from the output data vectors $B_0$ to $B_7$ of the second butterfly stage of the DCT by performing additions, subtractions, and multiplications with multiplication coefficients $L_4$ and $L_4/2$ using respective ones of the adders, subtractors, and multipliers of the butterfly circuitry according to: $C_0=B_0+B_2$, $C_1=B_0-B_2$, $C_2=B_2+B_3$, $C_3=(B_1-B_3)\times L_4$, $C_4=(B_4+B_6)\times L_4/2$, $C_5=B_4-B_6$, $C_6=B_5+B_7$, and $C_7=(B_5-B_7)\times L_4$;

the correction stage implementing step for the DCT includes computing output data vectors $D_0$ to $D_7$ of the correction stage of the DCT from input data vectors $C_0$ to $C_7$ of the correction stage of the DCT according to: $D_0=C_0$, $D_1=C_2$, $D_2=C_1$, $D_3=C_2-C_3$, $D_4=C_4$, $D_5=C_4-C_6$, $D_6=C_6-C_4-C_5$, and $D_7=C_4+C_5-C_7$;

where $L_j=2\cos(j\pi/16)$ and $j=1$ to 7.

10. A method as claimed in claim 9 wherein:

the correction stage implementing step for the IDCT includes computing output data vectors $A_0$ to $A_7$ of the correction stage of the IDCT from input data vectors $D_0$ to $D_7$ of the correction stage of the DCT according to: $A_0=D_0$, $A_1=D_4$, $A_2=D_2-D_6$, $A_3=D_6$, $A_4=D_1-D_3+D_5-D_7$, $A_5=D_5-D_7$, $A_6=D_3-D_5$, and $A_7=D_7$;

the butterfly stages of the IDCT comprise a first butterfly stage, a second butterfly stage, and a third butterfly stage:

the butterfly stages implementing step for the IDCT includes computing output data vectors $B_0$ to $B_7$ of the first butterfly stage of the IDCT from the output data vectors $A_0$ to $A_7$ of the correction stage of the IDCT by performing additions, subtractions, and multiplications with multiplication coefficients $L_4$ and $L_4/2$ using respective ones of the adders, subtractors, and multipliers of the butterfly circuitry according to: $B_0=A_0+A_1$, $B_1=A_0-A_1$, $B_2=A_2+A_3\times L_4$, $B_3=A_2-A_3\times L_4$, $B_4=A_4\times L_4/2+A_5$, $B_5=A_4\times L_4/2-A_5$, $B_6=A_6+A_7\times L_4$, $B_7=A_6-A_7\times L_4$;

the butterfly stages implementing step for the IDCT includes computing output data vectors $C_0$ to $C_7$ of the second butterfly stage of the IDCT from the output data vectors $B_0$ to $B_7$ of the first butterfly stage of the IDCT by performing additions, subtractions, and multiplications with multiplication coefficients $L_2/L_4$ and $L_6/L_4$ using respective ones of the adders, subtractors, and multipliers of the butterfly circuitry according to: $C_0=B_0+B_2\times L_2/L_4$, $C_1=B_0-B_2\times L_2/L_4$, $C_2=B_1+B_3\times L_6/L_4$, $C_3=B_1-B_3\times L_6/L_4$, $C_4=B_4+B_6\times L_2/L_4$, $C_5=B_4-B_6\times L_2/L_4$, $C_6=B_5+B_7\times L_6/L_4$, $C_7=B_5-B_7\times L_6/L_4$;

the butterfly stages implementing step for the IDCT includes computing output data vectors $x_0$ to $X_7$ of the third butterfly stage of the IDCT from the output data vectors $C_0$ to $C_7$ of the second butterfly stage of the IDCT by performing additions, subtractions, and multiplications with multiplication coefficients $L_1$, $L_3$, $L_5$, and $L_7$ using respective ones of the adders, subtractors, and multipliers of the butterfly circuitry according to: $x_0=C_0+C_4\times L_1$, $x_1=C_2+C_6\times L_3$, $x_2=C_3+C_7\times L_5$, $x_3=C_1+C_5\times L_7$, $x_4=C_1-C_5\times L_7$, $x_5=C_3-C_7\times L_5$, $x_6=C_2-C_6\times L_3$, $x_4=C_0-C_4\times L_1$.

11. A method as claimed in claim 7 wherein:

the correction stage implementing step for the IDCT includes computing output data vectors $A_0$ to $A_7$ of the correction stage of the IDCT from input data vectors $D_0$ to $D_7$ of the correction stage of the DCT according to: $A_0=D_0$, $A_1=D_4$, $A_2=D_2$, $A_3=D_2+D_6$, $A_4=D_1$, $A_5=D_5+D_3$, $A_6=D_1+D_3$, and $A_7=D_1+D_3+D_5+D_7$;

the butterfly stages of the IDCT comprise a first butterfly stage, a second butterfly stage, and a third butterfly stage:

the butterfly stages implementing step for the IDCT includes computing output data vectors $B_0$ to $B_7$ of the first butterfly stage of the IDCT from the output data vectors $A_0$ to $A_7$ of the correction stage of the IDCT by performing additions, subtractions, and multiplications with multiplication coefficients $P_4$ and $2P_4$ using respective ones of the adders, subtractors, and multipliers of the butterfly circuitry according to: $B_0=A_0+A_1$, $B_1=A_0-A_1$, $B_2=A_2+A_3\times P_4$, $B_3=A_2-A_3\times P_4$, $B_4=A_4\times 2P_4+A_5$, $B_5=A_4\times 2P_4-A_5$, $B_6=A_6+A_7\times P_4$, $B_7=A_6-A_7\times P_4$;

the butterfly stages implementing step for the IDCT includes computing output data vectors $C_0$ to $C_7$ of the second butterfly stage of the IDCT from the output data vectors $B_0$ to $B_7$ of the first butterfly stage of the IDCT by performing additions, subtractions, and multiplications with multiplication coefficients $P_2/P_4$ and $P_6/P_4$ using respective ones of the adders, subtractors, and multipliers of the butterfly circuitry according to: $C_0=B_0+B_2\times P_2/P_4$, $C_1=B_0-B_2\times P_2/P_4$, $C_2=B_1+B_3\times P_6/P_4$, $C_3=B_1-B_3\times P_6/P_4$, $C_4=B_4+B_6\times P_2/P_4$, $C_5=B_4-B_6\times P_2/P_4$, $C_6=B_5+B_7\times P_6/P_4$, $C_7=B_5-B_7\times P_6/P_4$;

the butterfly stages implementing step for the IDCT includes computing output data vectors $x_0$ to $x_7$ of the third butterfly stage of the IDCT from the output data vectors $C_0$ to $C_7$ of the second butterfly stage of the IDCT by performing additions, subtractions, and multiplications with multiplication coefficients $P_1$, $P_3$, $P_5$, and $P_7$ using respective ones of the adders, subtractors, and multipliers of the butterfly circuitry according to: $x_0=C_0+C_4\times P_1$, $x_1=C_2+C_6\times P_3$, $x_2=C_3+C_7\times P_5$, $x_3=C_1+C_5\times P_7$, $x_4=C_1-C_5\times P_7$, $x_5=C_3-C_7\times P_5$, $x_6=C_2+C_6\times P_3$, $x_4=C_0-C_4\times P_1$;

where $P_j=1/(2\cos(j\pi/16))$ and $j=1$ to 7.

12. A method as claimed in claim 11 wherein:

the butterfly stages of the DCT comprise a first butterfly stage, a second butterfly stage, and a third butterfly stage:

the butterfly stages implementing step for the IDCT includes computing output data vectors $A_0$ to $A_7$ of the first butterfly stage of the DCT from input data vectors $x_0$ to $x_7$ of the first butterfly stage of the DCT by performing additions, subtractions, and multiplications with multiplication coefficients $P_1$, $P_3$, $P_5$, and $P_7$ using respective ones of the adders, subtractors, and multipliers of the butterfly circuitry according to: $A_0=x_0+x_7$, $A_1=(x_0-x_7) \times P_1$, $A_2=(x_1+x_6)$, $A_3=(x_1-x_6) \times P_3$, $A_4=x_3+x_4$, $A_5=(x_3-x_4) \times P_7$, $A_6=x_2+x_5$, and $A_7=(x_2-x_5) \times P_5$;

the butterfly stages implementing step for the IDCT includes computing output data vectors $B_0$ to $B_7$ of the second butterfly stage of the DCT from the output data vectors $A_0$ to $A_7$ of the first butterfly stage of the DCT by performing additions, subtractions, and multiplications with multiplication coefficients $P_2/P_4$ and $P_6/P_4$ using respective ones of the adders, subtractors, and multipliers of the butterfly circuitry according to: $B_0=A_0+A_4$, $B_1=(A_0-A_4) \times P_2/P_4$, $B_2=A_2+A_6$, $B_3=(A_2-A_6) \times P_6/P_4$, $B_4=A_1+A_5$, $B_5=(A_1-A_5) \times P_2/P_4$, $B_6=A_3+A_7$, and $B_7=(A_3-A_7) \times P_6/P_4$;

the butterfly stages implementing step for the IDCT includes computing output data vectors $C_0$ to $C_7$ of the third butterfly stage of the DCT from the output data vectors $B_0$ to $B_7$ of the second butterfly stage of the DCT by performing additions, subtractions, and multiplications with multiplication coefficients $P_4$ and $P_4/2$ using respective ones of the adders, subtractors, and multipliers of the butterfly circuitry according to: $C_0=B_0+B_2$, $C_1=B_0-B_2$, $C_2=B_2+B_3$, $C_3=(B_1-B_3) \times P_4$, $C_4=(B_4+B_6) \times P_4/2$, $C_5=B_4-B_6$, $C_6=B_5+B_7$, and $C_7=(B_5-B_7) \times P_4$;

the correction stage implementing step for the DCT includes computing output data vectors $D_0$ to $D_7$ of the correction stage of the DCT from input data vectors $C_0$ to $C_7$ of the correction stage of the DCT according to: $D_0=C_0$, $D_1=C_2+C_3$, $D_2=C_1$, $D_3=C_3$, $D_4=C_4+C_6+C_7$, $D_5=C_5+C_6+C_7$, $D_6=C_5+C_7$ and $D_7=C_7$.

* * * * *